June 10, 1947.  G. V. JAKEWAY  2,421,889
FRICTION SUPPORT FOR LIDS
Filed Nov. 18, 1944
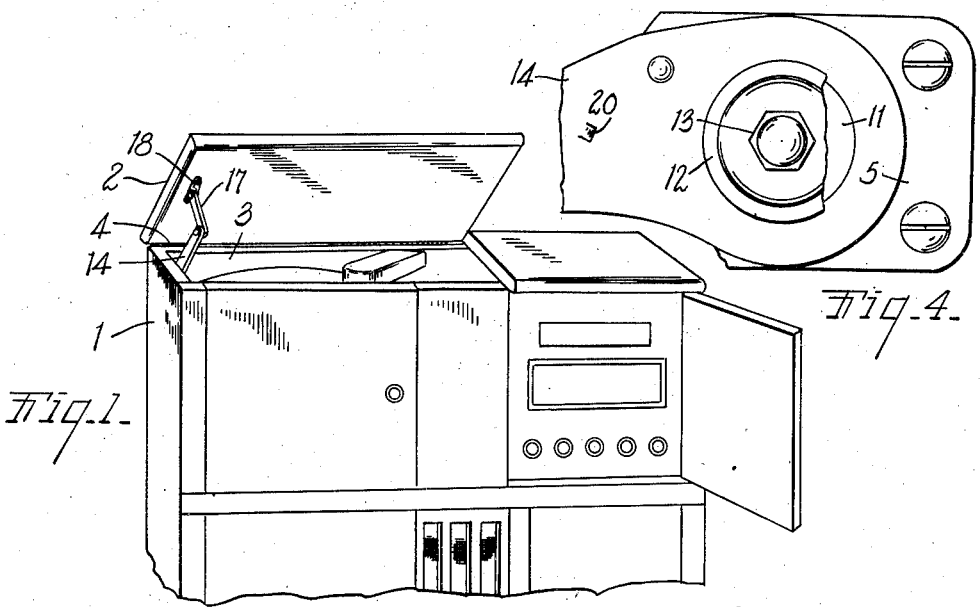
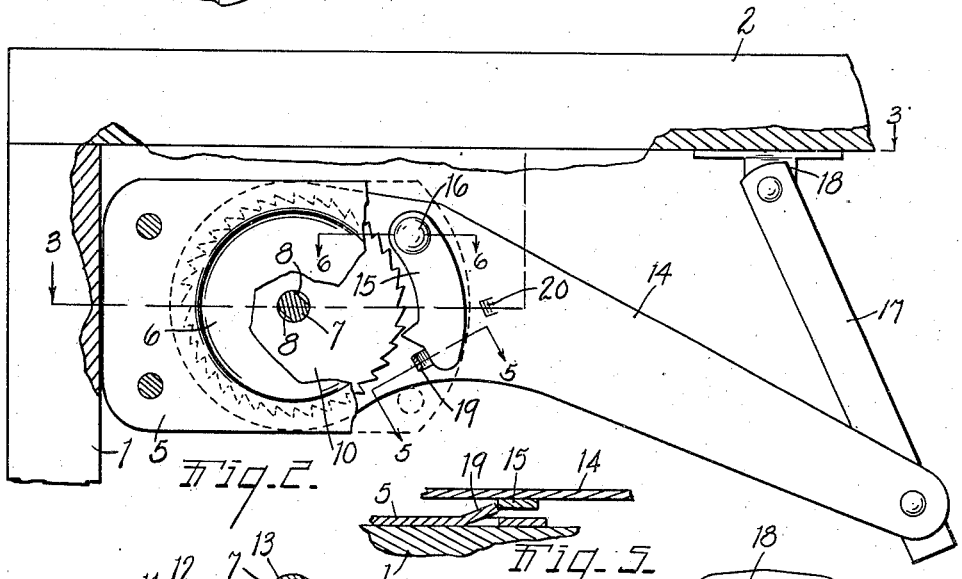
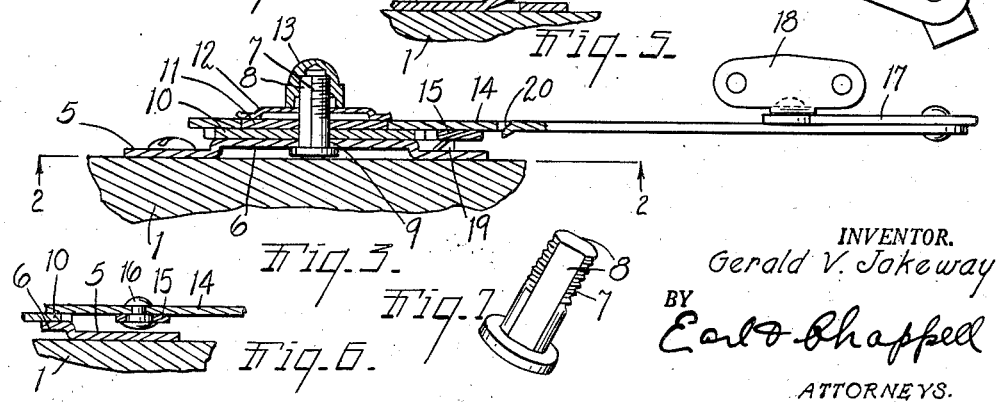
INVENTOR.
Gerald V. Jakeway
BY
Earl? Chappell
ATTORNEYS.

Patented June 10, 1947

2,421,889

UNITED STATES PATENT OFFICE 2,421,889

FRICTION SUPPORT FOR LIDS

Gerald V. Jakeway, Grand Rapids, Mich., assignor to Keeler Brass Company, Grand Rapids, Mich.

Application November 18, 1944, Serial No. 564,044

11 Claims. (Cl. 217—60)

This invention relates to improvements in friction supports for lids.

The main objects of this invention are:

First, to provide a friction support for lids such as the lids of combination phonograph and radio cabinets and the like in which the lid may be lifted freely without frictional resistance, is supported by frictional resistance, but must be closed against friction by a predetermined portion of the closing movement when it is allowed to drop to closed position.

Second, to provide a structure having these advantages which is capable of a wide range of adjustment to adapt it to lids of varying weight.

Third, to provide a support for lids which is not likely to result in the lids becoming distorted or warped.

Fourth, to provide a structure having these advantages which is very economical in its parts and in the assembly thereof.

Objects pertaining to details and economies of the invention will definitely appear from the description to follow. The invention is defined in the claims.

A structure embodying the features of the invention is clearly illustrated in the accompanying drawing, in which:

Fig. 1 is a fragmentary perspective view of a radio-phonograph combination cabinet with the lid of the phonograph record cabinet raised and the door of the radio compartment opened.

Fig. 2 is an enlarged fragmentary view partially in section on line 2—2 of Fig. 3, the lid being in closed position.

Fig. 3 is a fragmentary view partially in section on line 3—3 of Fig. 2.

Fig. 4 is a fragmentary side view showing further the relation of parts.

Fig. 5 is an enlarged fragmentary view on line 5—5 of Fig. 2.

Fig. 6 is a fragmentary view on line 6—6 of Fig. 2.

Fig. 7 is a perspective view of the spindle or stud.

In the accompanying drawing I have illustrated my invention as adapted to combination phonograph and radio cabinets in which 1 represents the cabinet and 2 the lid of the phonograph record compartment 3. The lid 2 is hinged at 4. Lids of this type are usually of considerable size and weight and it is desirable to have them open freely, support them in open position, and retard their closing movement. My invention accomplishes these results with the additional feature of permitting a complete seating closure of the lid which prevents or minimizes distortion and warping thereof.

The embodiment of my invention illustrated comprises a bracket or base plate 5 having a raised central portion 6, the face of which constitutes a friction surface. The spindle or stud 7 is flattened at 8; the hole 9 in the bracket is correspondingly shaped so that the spindle or stud is supported against rotation. The ratchet disk 10 is disposed against the friction surface 6; this disk being rotatable on the stud. A friction disk 11 is arranged on the outer side of the ratchet disk, and is non-rotatably engaged with the stud.

At the outer side of the friction disk is a spring thrust member 12 engaging the friction disk 11 and adjustably clamped thereon by means of the nut 13 threaded upon the stud or spindle. The friction disk 11 constitutes a bearing for the arm 14 and the spring thrust member 12 is preferably disposed to overlap the arm as shown in Fig. 3 so that it serves as a retaining member therefor. However, the arm is of slightly less thickness than the friction disk so that the thrust member does not apply friction to the arm. A pawl 15 is pivotally mounted at 16 on the arm 14 to coact with the ratchet disk. The swinging end of the arm is connected by the link 17 to the attaching plate 18 on the lid. A lug 19, preferably struck up from the base plate is disposed so as to disengage the pawl as the lid approaches its closed position, desirably only a fraction of an inch from the closing point, so that the arm is released from its frictional restraining means and the lid drops to completely closed position and into supporting engagement with the associated parts of the cabinet. A second lug 20 is preferably struck up from the arm to limit the outward swing of the pawl. The main purpose of this lug is to prevent the pawl from being swung completely out of cooperating relation to the ratchet during handling or transportation of the cabinet.

The nut 13 may be adjusted to secure the desired frictional resistance for supporting the lid and for restraining its closing movement. This also adapts the device to a wide range of structures, that is, to lids varying considerably in weight.

I have illustrated and described the invention in an embodiment which is highly practical and widely adaptable. I have not attempted to illustrate or describe other embodiments or adaptations as it is believed this disclosure will enable those skilled in the art to embody or adapt my invention as may be desired.

Having thus described my invention what I claim as new and desire to secure by Letters Patent is:

1. The combination with a cabinet and a lid therefor, of a base member secured to said cabinet and having a friction surface, a non-rotatable spindle projecting from said surface, a ratchet disk rotatable on said spindle and having frictional coaction with said frictional surface of said base member, a friction disk non-rotatably arranged on said spindle to coact with said ratchet, a spring thrust member arranged on said spindle to coact with said friction disk, an arm rotatably mounted on said friction disk, said thrust member overlapping said arm and constituting a retaining means therefor, a pawl pivotally mounted on said arm to coact with said ratchet, a link connecting said arm to said lid, and a tripping lug for said pawl disposed on said base member to disengage the pawl toward the end of the lid closing stroke of the arm thereby permitting the lid to fall during the last portion of the closing thereof.

2. The combination with a cabinet and a lid therefor, of a base member secured to said cabinet and having a friction surface, a non-rotatable spindle projecting from said surface, a ratchet disk rotatable on said spindle and having frictional coaction with said frictional surface of said base member, a friction disk non-rotatably arranged on said spindle to coact with said ratchet, an arm rotatably mounted on said friction disk, a pawl pivotally mounted on said arm to coact with said ratchet, a link connecting said arm to said lid, and a tripping lug for said pawl disposed on said base member to disengage the pawl toward the end of the lid closing stroke of the arm thereby permitting the lid to fall during the last portion of the closing thereof.

3. The combination with swingably associated members, of a bracket mounted on one of said members and having a projecting non-rotatable stud and a friction surface, a ratchet rotatable on said stud and having frictional coaction with said friction surface of said bracket, a friction member non-rotatably arranged on said stud to coact with said ratchet, a spring thrust member arranged on said stud to coact with said friction member, an adjusting nut for said thrust member threaded on said stud, an arm rotatably mounted on said friction member, said thrust member overlapping said arm and constituting a retaining means therefor, a pawl pivotally mounted in said arm to coact with said ratchet, a pawl engaging lug disposed on said bracket to disengage said pawl from said ratchet toward the end of the closing stroke of the arm, and means connecting said arm to the other of said members.

4. The combination with swingably associated members, of a bracket mounted on one of said members and having a projecting non-rotatable stud and a friction surface, a ratchet rotatable on said stud and having frictional coaction with said friction surface of said bracket, a friction member non-rotatably arranged on said stud to coact with said ratchet, a spring thrust member arranged on said stud to coact with said friction member, an adjusting nut for said thrust member threaded on said stud, an arm rotatably mounted on said friction member, a pawl pivotally mounted in said arm to coact with said ratchet, a pawl engaging lug disposed on said bracket to disengage said pawl from said ratchet toward the end of the closing stroke of the arm, and means connecting said arm to the other of said members.

5. In a support for lids and the like, the combination of a base member, a non-rotatable spindle carried thereby, said base member having a friction surface surrounding said spindle, a ratchet disk rotatable on said spindle in friction engagement with said friction surface, a friction disk constituting a bearing member non-rotatably disposed on said spindle in friction engagement with said ratchet disk, a spring thrust member on said spindle in thrust engagement with said friction disk, an adjusting nut on said spindle coacting with said spring thrust member, an arm rotatably mounted on said friction disk, a pawl pivotally mounted on said arm to coact with said ratchet disk, said base member having a lug thereon adapted to disengage said pawl from said ratchet disk at a predetermined point in the movement of the arm, and a second lug on said arm to limit the swing of said pawl away from said ratchet wheel.

6. In a support for lids and the like, the combination of a base member, a non-rotatable spindle carried thereby, said base member having a friction surface surrounding said spindle, a ratchet disk rotatable on said spindle in friction engagement with said friction surface, a friction disk constituting a bearing member non-rotatably disposed on said spindle in friction engagement with said ratchet disk, a spring thrust member on said spindle in thrust engagement with said friction disk, an adjusting nut on said spindle coacting with said spring thrust member, an arm rotatably mounted on said friction disk, and a pawl pivotally mounted on said arm to coact with said ratchet disk, said base member having a lug thereon adapted to disengage said pawl from said ratchet disk at a predetermined point in the movement of the arm.

7. In a support for lids and the like, the combination of a base member, a non-rotatable spindle carried thereby, said base member having a friction surface surrounding said spindle, a ratchet disk rotatable on said spindle in friction engagement with said friction surface, a friction disk constituting a bearing member non-rotatably disposed on said spindle in frictiton engagement with said ratchet disk, a spring thrust member on said spindle in thrust engagement with said friction disk, an adjusting nut on said spindle coacting with said spring thrust member, an arm pivotally mounted on said friction disk, and a pawl pivotally mounted on said arm to coact with said ratchet disk.

8. In a support for lids and the like, the combination of a base member, a non-rotatable spindle carried thereby, said base member having a friction surface surrounding said spindle, a ratchet disk rotatable on said spindle in friction engagement with said friction surface, a friction disk constituting a bearing member non-rotatably disposed on said spindle in friction engagement with said ratchet disk, a spring thrust member on said spindle in thrust engagement with said friction disk, an arm rotatably mounted on said friction disk, and a pawl pivotally mounted on said arm to coact with said ratchet disk.

9. The combination with a cabinet and a vertically swinging lid therefor, of a bracket mounted on said cabinet, a spindle carried thereby, a plurality of friction elements including a ratchet mounted on said spindle, said ratchet element being rotatable relative to other of said friction elements, means for varying the friction on said ratchet element, an arm rotatably carried by said bracket, a pawl on said arm coacting with said ratchet element, said bracket having a lug adapted to disengage the pawl at a predetermined point in the lid closing movement of the arm whereby the arm is freed from frictional restraint, and a link connecting said arm to said lid.

10. The combination with a cabinet and a vertically swinging lid therefor, of a bracket mounted on said cabinet, a spindle carried thereby, a plurality of friction elements including a ratchet mounted on said spindle, said ratchet element being rotatable relative to other of said friction elements, an arm rotatably carried by said bracket, a pawl on said arm coacting with said ratchet element, a fixedly mounted lug adapted to disengage the pawl at a predetermined point in the lid closing movement of the arm whereby the arm is freed from frictional restraint, and a link connecting said arm to said lid.

11. The combination with a cabinet and a vertically swinging lid therefor, of a lid supporting pivoted arm, a rotatable ratchet-like element, frictional means for retarding said ratchet-like element against rotation, a pawl-like means connected to said arm and engageable with said ratchet-like element for supporting the arm with the lid in open position, and means adapted to disengage the pawl-like means from the ratchet-like element at a predetermined point in the lid closing movement of the arm whereby the arm is freed from frictional restraint and the lid allowed to drop freely into place.

GERALD V. JAKEWAY.

REFERENCES CITED

The following references are of record in the file of this patent:

UNITED STATES PATENTS

| Number | Name | Date |
| --- | --- | --- |
| 1,077,124 | Dangleman | Oct. 28, 1913 |
| 1,595,500 | Burton | Aug. 10, 1926 |
| 1,387,833 | Cheney | Aug. 16, 1921 |
| 1,853,708 | Teaf | Apr. 12, 1932 |
| 2,213,319 | Lickteig | Sept. 3, 1940 |

FOREIGN PATENTS

| Number | Country | Date |
| --- | --- | --- |
| 516,356 | Great Britain | Jan. 1, 1940 |